United States Patent [19]

Takahashi et al.

[11] 4,002,584
[45] Jan. 11, 1977

[54] PROCESS FOR THE PRODUCTION OF URETHANE ELASTOMERS

[75] Inventors: Akio Takahashi, Yokohama; Hirokichi Saito, Shimizu; Yoshijiro Oyaizu, Yaizu, all of Japan

[73] Assignee: Ihara Chemical Kogyo Kabushiki Kaisha, Tokyo, Japan

[22] Filed: Aug. 5, 1974

[21] Appl. No.: 495,097

[30] Foreign Application Priority Data

Aug. 6, 1973  Japan .................... 48-88235

[52] U.S. Cl. .................. 260/18 TN; 260/75 NB; 260/75 NC; 260/77.5 AB; 260/77.5 AC; 260/75 NH; 260/77.5 AM
[51] Int. Cl.² .................. C08G 18/18; C08G 18/32
[58] Field of Search ..... 260/75 NH, 75 NB, 75 NC, 260/77.5 AM, 77.5 AB, 77.5 AC, 18 TN, 2.5 AM, 2.5 AZ, 2.5 A

[56] References Cited

UNITED STATES PATENTS

| | | | |
|---|---|---|---|
| 3,036,996 | 5/1962 | Kogon | 260/77.5 AM |
| 3,379,691 | 4/1968 | Sundholm | 260/75 NH |
| 3,408,301 | 10/1968 | Sundholm | 260/75 NH |
| 3,422,165 | 1/1969 | Brotherton et al. | 260/75 NH |
| 3,489,723 | 1/1970 | Kraft | 260/77.5 |
| 3,632,845 | 1/1972 | Brownsword | 260/75 NH |
| 3,738,953 | 6/1973 | Anorga et al. | 260/2.5 AM |

FOREIGN PATENTS OR APPLICATIONS 981,935   1/1965   United Kingdom

OTHER PUBLICATIONS

Doyle, Development and Use of Polyurethane Products, McGraw-Hill, N.Y. (1971), pp. V-VII, 28, 29, 249-251.
Axelrood et al., Ind. and Eng. Chem., vol. 53, No. 11, (Nov. 1961), pp. 889-895.
Frisch et al., Plastic Foams, Part I, Dekker, Inc., (N.Y.), 1972, pp. VII-IX, 112, 114, 116, 130, 132, 136, and 137.

Primary Examiner—H.S. Cockeram
Attorney, Agent, or Firm—William J. Daniel

[57] ABSTRACT

Urethane elastomers are prepared by reacting a long-chain polyol having a molecular weight of 400 - 5000 in a one-shot operation with an organic diisocyanate and a halogenated aromatic diamine of the general formula:

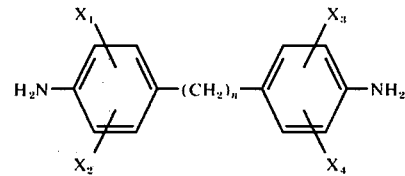

wherein $X_1$, $X_2$, $X_3$ and $X_4$ are the same or different and each represents a halogen atom and $n$ is zero or 1. According to this process, urethane elastomers possessing excellent physical characteristics can be produced economically and advantageously in the operations.

6 Claims, No Drawings

PROCESS FOR THE PRODUCTION OF URETHANE ELASTOMERS

BACKGROUND OF THE INVENTION

This invention relates to a process for the production of urethane elastomers possessing excellent physical characteristics in a one-shot operation.

A known conventional method for producing urethane elastomers comprises a first step of preparing a liquid prepolymer with terminal isocyanate groups by reacting a long-chain diol having a molecular weight of 400 – 3000 with an excess amount of an aromatic diisocyanate and a second step of producing shaped urethane elastomers by mixing the liquid prepolymer prepared in the first step with a curing agent such as a low molecular diol or an aromatic diamine and charging a mold with the mixture under atmospheric or superatmospheric pressure to effect a main chain extension reaction for the prepolymer by reacting the prepolymer with the diol or aromatic diamine. This known conventional method wherein such liquid prepolymer is used has technical merit in that the reaction in the individual steps can easily be controlled to secure the production of urethane elastomers having a desired molecular structure. However, this prior art method encounters many problems in the actual molding operations. According to this prior art method, the prepolymer having terminal isocyanate groups readily absorbs moisture in the air which reacts with the isocyanate groups to form urea as shown by the following reaction formulas:

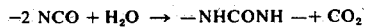

or decomposes the isocyanate group by hydrolysis to form an amine as shown by the following general formulas:

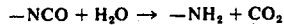

Thus, the prior art method permits dissipation of the isocyanate groups and increase in viscosity of the prepolymer and, in the extreme case, the formation of an insoluble elastomeric film. Such chemical denaturation of the starting material causes considerable deterioration in useful properties of the resulting urethane elastomers. Moreover, the insoluble elastomeric film adheres to vessels and equipment used for the molding operation. Thus, much additional work is required for washing out the adhering film, which obviously causes a significant loss of the starting material.

When a large amount of urethane elastomer is produced according to the prior art method by using an automatic continuous mixing-molding apparatus, the viscosity of the prepolymer is apt to fluctuate with the temperature and the liquid prepolymer readily adheres to or is hardened on the surface of pumps, pipes and the like feeding equipment. Thus, the transported amount of the liquid prepolymer varies according to fluctuation in its viscosity, thus resulting in indefinite proportion of the prepolymer to the curing agent and in changes in the amounts of starting materials used. These are serious drawbacks in putting the prior art method into practice.

Recently, aromatic amines have been suspected of containing hygienically harmful substances. The same applies to aromatic diamines utilizable as curing agents for the liquid prepolymer. According to the known conventional method, an aromatic diamine which is solid under normal conditions, must be fused by heating it at a temperature higher than the melting point of the aromatic diamine prior to mixing with the liquid prepolymer. Under such circumstances, workers are at all times exposed to the danger of inhaling dust or vapor of the harmful aromatic diamine. At present, this danger cannot be perfectly prevented.

It is known that a one-shot method wherein an aromatic diamine, a long-chain diol and an aromatic diisocyanate are reacted directly in one step to produce urethane elastomers can be adopted to overcome the above-mentioned drawbacks and problems in the known conventional methods. At present, however, the one-shot method is applicable only to the case wherein urethane foams or urethane products with low hardness and strength are produced by using a low molecular weight diol as curing agent. Accordingly, the one-shot method cannot be adopted to produce high quality urethane products which are excellent in elasticity, hardness and strength by using an aromatic diamine as curing agent.

To impart high hardness and strength to urethane elastomers, an aromatic diamine must be used as curing agent. However, if an aromatic diamine, a long-chain diol and an aromatic diisocyanate which have been used hitherto in the prior art methods are mixed simultaneously, the reaction between the amino groups and the isocyanate groups will proceed preferentially and a resinous polyurea will be precipitated as insoluble material, as the reaction rate between the amino groups of the aromatic diamine and the isocyanate groups of the aromatic diisocyanate is much greater than that between the hydroxyl groups of the long-chain diol and the isocyanate groups of the aromatic diisocyanate. Although the polyurea precipitated as insoluble solid is presumed to have terminal isocyanate groups, it hardly reacts with the long-chain diol having terminal hydroxyl groups. Accordingly, the diol eventually remains unreacted in the product. Such diol-containing product is a clay-like solid with inferior and unstable properties and is hardly suitable as a urethane elastomer.

The rate of reaction between —OH groups and —NCO groups can be increased and the reaction between —NH$_2$ groups and —NCO groups can be inhibited by the aid of a catalyst such as triethylenediamine or stannous octanoate in an amount of more than 10 times as much as the amount usually used. The molded products thus obtained are improved to some extent in physical properties, but they involve cracks and bubbles and cannot be used for practical purposes. In addition, the pot life (i.e. the period of time wherein a soft mixture containg curing agent changes into a mixture which can not be poured into a mold of this product is too short to secure enough working time.

In order to produce elastomers with excellent physical properties by such one-shot method, it is necessary to find out such a curing agent as having a very low reactivity with the isocyanate group and being capable of imparting excellent properties to the resulting urethane elastomers. In general, however, urethane elastomers obtained by using a curing agent having a low reactivity with the isocyanate group tend to possess poor physical properties. Thus, curing agents suitable for the production of urethane elastomers by the one-shot operation have not yet been found.

BRIEF SUMMARY OF THE INVENTION

An object of the present invention is to provide a process for the production of urethane elastomers possessing excellent physical properties including high hardness according to the one-shot method.

Another object of this invention is to provide an economical process for producing urethane elastomers possessing excellent physical properties advantageously in the operations without accompaniment of any danger to health.

Other and further objects, features and advantages of this invention will appear more fully from the following description.

DETAILED DESCRIPTION OF THE INVENTION

As the result of much research carried out for developing a method for producing in a one-shot operation urethane elastomers possessing excellent physical properties including high hardness, we have found a curing agent which meets the above-mentioned requirements and are thus suitable for producing urethane elastomers in a one-shot operation. This invention has been accomplished on the basis of the above findings.

In accordance with this invention, there is provided a process for the production of urethane elastomers which comprises reacting a long-chain polyol having a molecular weight of 400 – 5000 in a one-shot operation with an organic diisocyanate and a halogenated aromatic diamine of the general formula:

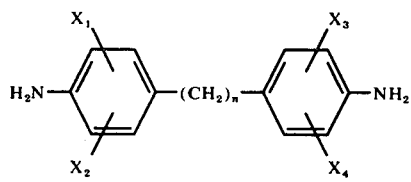

wherein $X_1$, $X_2$, $X_3$ and $X_4$ are the same or different and each represents a halogen atom and $n$ is 0 or 1.

Any of the compounds represented by the above general formula and a mixture thereof, can be used as the halogenated aromatic diamine for the process of this invention. The use of the halogenated aromatic diamine in which the benzene nuclei carry assymmetrically substituted halogen atoms tends to reduce the hardness of the resulting urethane elastomers. Since a compound of this type is very slow in the reaction rate with the diisocyanates, however, the use of this compound is preferable in the case of subjecting a large amount of the starting materials to the reaction at one time.

Among the compounds of the above general formula (I), examples of those wherein n stands for 1 include:

1. 4,4'-methylene-bis-(2,3-dichloroaniline)

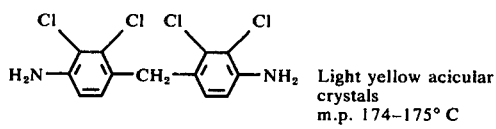

Light yellow acicular crystals
m.p. 174–175° C 2. 4,4'-methylene-bis-(2,5-dichloroaniline)

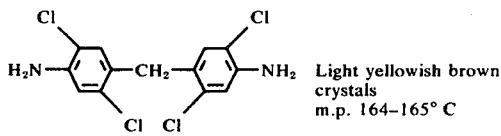

Light yellowish brown crystals
m.p. 164–165° C 3. 4,4'-methylene-bis-(2,6-dichloroaniline)

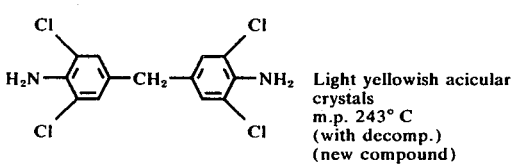

Light yellowish acicular crystals
m.p. 243° C
(with decomp.)
(new compound)

4. 4,4'-methylene-bis-(2,6-dibromoaniline)

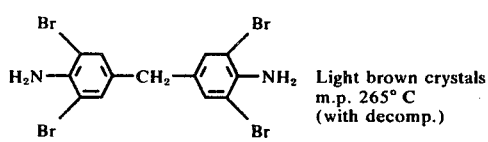

Light brown crystals
m.p. 265° C
(with decomp.)

5. 2,3,2',5'-tetrachloro-4,4'-diamino-diphenylmethane
6. 2,3,2',6'-tetrachloro-4,4'diamino-diphenylmethane
7. 2,5,2',6'-tetrachloro-4,4'-diamino-diphenylmethane
8. 2,5-dichloro-2',6'-dibromo-4-4'-diamino-diphenylmethane
9. 2,3-dichloro-2',6'-dibromo-4-4'-diamino-diphenylmethane
10. 2,6-dichloro-2',6'-dibromo-4-4'-diamino-diphenylmethane These 4,4'-methylene-bis-(dihalogenated aniline) compounds can easily be prepared by reacting one or two kinds of a dihalogenated aniline in water or an organic solvent with formaldehyde in the presence of an acid catalyst. These compounds may be in the form of a mixture of three kinds of 4,4'-methylene-bis-(dihalogenated aniline) compounds obtained by reacting two kinds of dihalogenated anilines different in the positions to which the halogen atoms are bonded.

Among the compounds of the above general formula (II), examples of those wherein n is zero include:

1. 2,2',5,5'-tetrachlorobenzidine

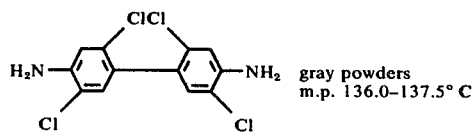

gray powders
m.p. 136.0–137.5° C 2. 2,2',6,6'-tetrachlorobenzidine

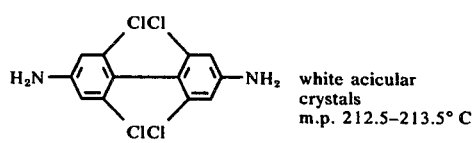

white acicular crystals
m.p. 212.5–213.5° C 3. 3,3',5,5'-tetrachlorobenzidine

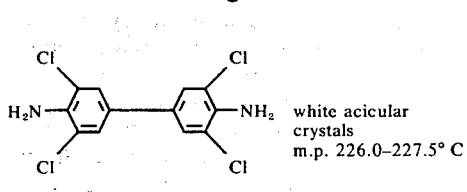 white acicular crystals
m.p. 226.0–227.5° C 4. 3,3',5,5'-tetrabromobenzidine

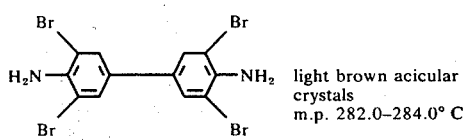 light brown acicular crystals
m.p. 282.0–284.0° C

These tetrahalogenated benzidine compounds can easily be prepared by subjecting one or two kinds of a dihalogenated nitrobenzene to a simultaneous reduction-rearrangement reaction in the presence of Zn powder.

The above-mentioned 4,4'-methylene-bis-(dihalogenated aniline) compounds and tetrahalobenzidine compounds are higher in melting point than aromatic diamine used in the conventional methods as curing agent for a liquid prepolymer and so are inappropriate for the case wherein a curing agent is mixed in a molten state with a prepolymer prior to molding as seen in the conventional method using a liquid prepolymer as starting material. In the process of this invention wherein the materials are reacted in a one-shot operation, these diamino compounds can previously be dissolved in the long-chain polyol used as one of the starting materials. Accordingly, the higher melting point of these diamino compounds would not result in trouble in practical use.

Illustrative of the long-chain polyol used in this invention, which has a molecular weight of 400 – 5000, are aliphatic polyester glycols obtained by a condensation reaction for chain extension of an aliphatic glycol with a dicarboxylic acid, such as polyethylene adipate, polybutylene adipate and polypropylene adipate; polyalkylene ether glycols obtained by decyclizing polymerization of ethylene oxide, propylene oxide, tetrahydrofuran and the like cyclic ether, such as polypropylene ether glycol and tetramethylene ether glycol; polyester glycols obtained by decyclizing polymerization of -caprolactone; polyols obtained by introducing hydroxyl groups into the terminal ends of polybutadiene; copolymerizates of at least two alkylene oxides; copolymerizates of at least two glycols and a dicarboxylic acid; long-chain diols having a molecular weight of 400 – 3000 such as a mixture of aromatic glycols; and polyester polyols or polyether polyols having 2–4 hydroxyl groups per molecule and a molecular weight of 600 – 5000, for example polyester polyols obtained by co-condensation of a polyol such as glycerol or trimethylolpropane with an aliphatic glycol and a dicarboxylic acid, and polyether polyols obtained by decyclizing polymerization of cyclic ethers such as ethylene oxide, propylene oxide and tetrahydrofuran in the presence of glycerol or trimethylolpropane as initiator. In other words, all of the polyols having hydroxyl groups at the terminal ends of compounds having a long-chain and carbon-linkages, ether-linkages and ester-linkages can be used as the long-chain polyol.

In comparison with the known conventional methods where a liquid prepolymer is used as starting material, the process of this invention is advantageous in that a wide variety of long-chain polyols can be used. Especially, the use of a polyester polyol or polyether polyol having 2–4 hydroxyl groups per molecule and a molecular weight of 600 – 5000 enable the production of urethane elastomers having excellent property not expected in those obtained from an ordinary long-chain diol, such as low distortion against compression.

These long-chain polyols are generally hygroscopic and any moisture contained in such polyols reacts with the isocyanate group of the aromatic diisocyanate to evolve carbon dioxide, thus causing the formation of bubbles in the product. Accordingly, it is desirable to dehydrate the polyol prior to the reaction. The dehydration condition varies according to the amount of the long-chain polyol but is generally conducted at 120° C for about 2 hours under reduced pressure of 20 mm Hg or more. If necessary, further dehydration may be carried out for removing a trace of water contained in the polyol by the aid of a dehydrating agent such as calcium sulfate, sodium hydrogen sulfate, calcium oxide, barium oxide, aluminum oxide, calcium chloride, silica gel or the like inorganic substance or acetic anhydride, phthalic anhydride or the like mono- or dicarboxylic acid anhydride or by the aid of a specific desiccant such as sellaite, zeolite or molecular sieve. In addition, a conventional hydrolysis-preventing agent such as a hydrazine compound, carbodiimide, 4,4'-dimethyl-2,6,2',6'-tetraethyl-diphenylcarbodiimide, 2,2',6,6'-tetraisopropyl-diphenylcarbodiimide, an aromatic/aliphatic carbodiimide compound, a carbodiimide-modified organic silicon compound, a polycarbodiimide compound, dithiocarbamic acid derivative or a benzotriazole compound may be used as a bubble-inhibiting agent.

Examples of the aromatic diisocyanate used in the process of this invention include 2,4-tolylene diisocyante (2,4-TDI), 2,6-tolylene diisocyanate (2,6-TDI), a mixture of 2,4-TDI and 2,6-TDI, a dimer of 2,4-TDI, m-phenylene diisocyanate, 4,4'-biphenyl diisocyanate, 3,3'-ditoluene-4,4'-diisocyanate (TODI), dianisizine diisocyanate (DADI), 4,4'-diphenylmethane diisocyanate (MDI), 3,3'-dimethyl-4,4'-diphenylmethane diisocyanate and 1,5-naphthalene diisocyanate (NDI).

These aromatic diisocyanates are used in an amount of 0.90 – 1.30 equivalents, preferably 1.00 – 1.15 equivalents per the total number of $NH_2$ groups in the 4,4'-methylene-bis-(dihalogenated aniline) and/or tetrahalogenated benzidine and OH groups in the long-chain polyol.

In the process of the present invention wherein the halogenated aromatic diamine of the general formula (I), the long-chain polyol and the aromatic diisocyanate are reacted together at the same time to produce an urethane elastomer aimed at, various catalysts may be used if controlling of reactivity between OH groups and NCO groups and reactivity between $NH_2$ groups and NCO groups is necessary for the reason that the long-chain polyol having the terminal hydroxy groups varies in reactivity with NCO groups according to its sort and molecular weight and thus controlling of reactivity between the functional groups often becomes necessary according to the hardness of a desired urethane elastomer and the quantities of the starting materials.

Illustrative of such catalyst are inorganic and organic tin compounds such as stannous chloride, stannic chloride, tetra-n-butyl tin, tri-n-butyl tin acetate, n- butyl tin trichloride, trimethyl tin hydroxide, dimethyl tin dichloride, dibutyl tin dilaurate, dibutyl tin 2-ethylhexoate and stannous octoate; tertiary amines such as triethylamine, triethylenediamine, hexamethylenetriamine, N-methylmorpholine, N-ethylmorpholine, N-pentamethyldiethylenetriamine, N-hexamethyltriethylenetetramine, N,N-diethylaniline, N,N-dimethylbenzylamine, N,N-dimethyllaurylamine, N,N-dimethylpiperidine, N,N,N',N'-tetramethylethylenediamine, N,N,N',N'-tetramethylpropylenediamine, N,N,N',N'-tetramethyl-1,3-butylenediamine, N,N,N',N'-tetramethylhexamethylenediamine, N,N,N'N',N'',N''-hexamethyltriethylenetetramine; cyclic amidines and quaternary ammonium salts thereof such as 1,8-diaza-bicyclo-(5·4·0)-undecene-7 (DBU available from Sun Abbott), DBU-methylammonium methosulfate and DBU-ethylammonium bromide; and other metal compounds such as cobalt naphthenate, sodium o-phenylphenate, bismuth nitrate, potassium oleate, tetra(2-ethylhexyl) titanate, cobalt 2-ethylhexoate (Co 6%), ferric chloride, ferric 2-ethylhexoate (Fe 6%), zinc naphthenate (Zn 14.5%) and antimony trichloride.

For producing urethane elastomers according to the process of this invention, the long-chain polyol previously dehydrated to have a moisture content of 0.1% or less and the halogenated aromatic diamine are mixed with the aromatic diisocyanate, or alternatively, the halogenated aromatic diamine is dissolved in the previously dehydrated long-chain polyol and the mixture is then mixed with the aromatic diisocyanate, whereby the three ingredients, the polyol, the diamine and the diisocyanate are reacted together at the same time at a temperature ranging from room temperature to 150° C.

The mixture is gelled within a few minutes to several ten minutes. Within a period of time from mixing the three ingredients until gelling (i.e. pot life), the mixture is poured into a mold where the mixture is allowed to stand for several minutes to several hours to effect curing of the mixture. The cured product is released from the mold and then thermoaged at a temperature ranging from room temperature to 130° C for several hours to several days to complete the reaction thereby producing the urethane elastomer aimed at.

In the process of this invention, various auxiliary substances used for urethane elastomers in the known conventional methods, for example, antioxidants, ultraviolet rays absorbing agents, stabilizers, coloration-preventing agents, hydrolysis-preventing agents, fungicides, combustion-inhibiting agents, colorants and other filler materials can also be used jointly without any trouble.

The prime technical merit and gist of this invention are that by the use of the specific halogenated aromatic diamine as curing agent, all the ingredients are easily dissolved therein to form a stable solution which can be used advantageously for the one-shot method which, according to the known conventional arts, is difficult to proceed, whereby urethane elastomers with excellent physical properties including high hardness can easily be produced. According to this invention, urethane elastomers aimed at can be obtained in a simple manner by mixing the halogenated aromatic diamine, the long-chain polyol and the aromatic diisocyanate in a vessel such as a beaker and then pouring the mixture into a mold where the mixture is maintained until the cured urethane elastomer is obtained.

Another technical merit of this invention is that the hologenated aromatic diamine used therein as a curing agent is easily soluble in the long-chain polyol. Accordingly, the curing agent of this invention can previously be dissolved in the long-chain polyol thereby perfectly preventing workers from danger of inhaling dust or vapor of the aromatic diamine which is suspected of containing hygienically harmful functions. In the present invention, therefore, handling of the materials is quite easy and safe.

There is an additional merit that the long-chain polyol having the halogenated aromatic diamine dissolved therein permits no precipitation of crystals of the diamine even when allowed to stand for a long period of time. The solution is stable and hardly varies in viscosity at a temperature ranging from room temperature to the operation temperature. Thus, the materials may be reacted and cured even at room temperature. As the solution is free from any component forming an adhesive cured film such as liquid prepolymer, the solution can be used in an automatic continuous mixing/molding apparatus utilizable for the coventional methods for producing urethane foam where the flow rate of the solution in the continuous molding equipment can constantly be maintained to permit the production of a large amount of urethane elastomers possessing uniform quality.

As still another merit of this invention, a wide variety of long-chain polyols can be used in comparison with the case of the known conventional methods where a liquid prepolymer is used. The use of a long-chain polyester polyol or polyether polyol having 2-4 hydroxyl groups per molecule and a molecular weight of 600 – 5000 enables the production of urethane elastomers having excellent property not expected in those obtained when an ordinary long-chain diol alone is used.

It is a still further merit of this invention that the amount of work required in the known conventional methods using a liquid prepolymer for manufacturing urethane elastomers can be decreased to ½ – ⅓ in the process of the present invention using for manufacturing urethane elastomers. Accordingly, the one-shot process for producing urethane elastomers of this invention is economically very advantageous not only in a small scale production mode, but also in a large scale production mode and thus brings about great industrial advantages.

The following examples are included merely to aid in the understanding of the invention and variations may be made by one skilled in the art without departing from the spirit and scope of the present invention.

EXAMPLE 1

18 Grams of 3,3',5,5'-tetrachlorobenzidine (3,3',5-,5'-TCB) were dissolved at 180° C in 100 g of polypropylene ether glycol (PPG; OH number 110; moisture 0.03%)and the mixture was cooled to 80° C and admixed under agitation with 29 g of a mixture of 20% 2,6-tolylene diisocyanate and 80% 2,4-tolylene diisocyanate. The reaction temperature was raised to 130° C.

If bubbles were formed in the mixture, it was degassed in vacuo for about one minute. The mixture was poured into a mold.

The mold was kept at 110°-120° C for about 2 hours and then the content was released and thermoaged for 24 hours in hot air kept at 100°-110° C to yield an urethane elastomer.

The operation conditions in this example and the various physical characteristics of the resultant urethane elastomer are shown in Table 1.

COMPARATIVE EXAMPLE 1

3,3',5,5'-TCB used in Example 1 was replaced by 3,3'-dichlorobenzidine (3,3'-DCB) which is recommended in the conventional methods as a curing agent for liquid prepolymer and admixed with PPG and TDI-80 as described in Example 1. The mixture was gelled in about 30 seconds to a white clay-like substance which could not be poured into a mold. The results are shown in Table 1.

COMPARATIVE EXAMPLE 2

129 Grams of a liquid prepolymer having terminal isocyanate groups (NCO equivalent 4.35) prepared by reacting 100 g of PPG (OH number 110; moisture 0.03%) with 29 g of TDI-80 were admixed at 240° C under agitation with 18 g of 3,3',5,5'-TCB. The mixture was then poured into a mold and cured therein in a manner similar to that described in Example 1. The resultant cured product contained 3,3',5,5'-TCB precipitated as solid and had very poor physical characteristics.

As 3,3',5,5'-TCB used in this comparative example has a high melting point of 226.0–227.5° C, crystals of 3,3',5,5'-TCB will be formed during the reaction unless the reaction temperature is maintained at a temperature higher than the melting point, thus making the operation troublesome and giving workers hygienically harmful effects, the results are shown in Table 1.

COMPARATIVE EXAMPLE 3

129 Grams of the liquid prepolymer as used in Comparative Example 2 were admixed with 13 g of 3,3'-DCB molten at 140° C. The liquid mixture was poured into a mold and cured as described in Example 1 to produce an urethane elastomer.

This conventional method requires more working steps than the process of the present invention. Moreover, this method requires fusion of 3,3'-DCB as in the case of Comparative Example 2 by heating it above the melting point prior to the reaction. Heating of 3,3'-DCB to such a high temperature is hygienically harmful to workers. The results obtained are also shown in Table 1.

Table 1

|  | Example 1 | Comparative Example 1 | Comparative Example 2 | Comparative Example 3 |
|---|---|---|---|---|
| PPG | 100 g | 100 g | Liquid prepolymer 129 g | Liquid prepolymer 129 g |
| TDI-80 | 29 g | 29 g | | |
| 3,3',5,5'-TCB | 18 g | — | 18 g | — |
| 3,3'-DCB | — | 13 g | — | 13 g |
| Pot life (min.) | 10.5 | 0.5 | 30 | 8 |
| Release time (min.) | 120 | Not moldable | 180 | 50 |
| Number of working Steps (index) | 60 | | 120 | 100 |
| Difficulty during operations | none | | Precipitation of amine detected | none |
| Hardness (Hs) | 85 | (white clay-like substance) | 70 | 85 |
| Tensile strength (kg/cm²) | 310 | | 180 | 285 |
| Break expansion (%) | 450 | | 500 | 510 |
| Repulsion elasticity (%) | 40 | | 28 | 40 |
| Tear resistance (kg/cm) | 65 | | 32 | 60 |

Notes:
(1) The number of working steps in the table is shown in terms of a comparative index when the number of working steps in the conventional method shown in Comparative Example 3 using a liquid prepolymer is 100.
(2) Hardness is determined according to JIS K6301 (1971).

EXAMPLE 2

14 Grams of 4,4'-methylene-bis-(2,5-dichloroaniline) (2,5-TCDAM) were dissolved in 100 g of a polyester (OH number 55) prepared by decyclizing polymerization of ε-caprolactone and the mixture was dehydrated at 140° C for 2 hours under reduced pressure of 30 mm Hg. The mixture was admixed under agitation with 2 g of carbodiimide (the product available from Bayer AG, West Germany) and then with 26 g of 3,3'-ditoluene-4,4'-diisocyanate (TODI) molten at 80° C. The mixture was poured into a mold and then thermoaged at 100° C for 15 hours according to the same method as described in Example 1 to yield an urethane elastomer.

According to this example, the molding mixture has an extremely long pot-life and is thus suitable for manufacturing moldings having a large size. The physical characteristics of the resulting urethane elastomer are shown in Table 2.

EXAMPLES 3–5

In a manner similar to that described in Example 2, a mixture of a 4,4'-methylene-bis-(dihalogenated aniline) and a tetrahalogenated benzidine was used to produce an urethane elastomer the physical characteristics of which are shown in Table 2.

Table 2

|  | Example 2 | Example 3 | Example 4 | Example 5 |
|---|---|---|---|---|
| [Proportion of curing agent (%)] | 100 % | 50 % | 70 % | 50 % |
| 2,5-TCDAM | | | | |
| 2,3-TCDAM | — | 50 % | 30 % | — |
| 2,5,2',5'-TCB | — | — | — | 50 % |

Table 2-continued

|  | Example 2 | Example 3 | Example 4 | Example 5 |
| --- | --- | --- | --- | --- |
| Pot life (min.) | 30 | 50 | 80 | 40 |
| Release time (min.) | 180 | 240 | 260 | 200 |
| Hardness (Hs) | 70 | 62 | 60 | 75 |
| Tensile strength (kg/cm$^2$) | 265 | 240 | 225 | 190 |
| Break expansion (%) | 620 | 580 | 700 | 450 |
| Repulsion elasticity (%) | 30 | 25 | 25 | 40 |

Notes:
2,3-TCDAM stands for 4,4'-methylene-bis (2,3-dichloroaniline), 2,5,2',5'-TCB stands for 2,2',5,5'-tetrachlorobenzidine.

EXAMPLE 6

The effects of various catalysts were compared by using 100 g of polytetramethylene ether glycol (PTMG; OH number 100), 19 g of 2,3-TCDAM and 29 g of TDI-80 and various catalysts, and mixing and molding the mixture in the same manner as described in Example 1. The results of the comparison are tabulated in Table 3.

Table 3

| Exp. No. | I | II | III | IV | V | VI |
| --- | --- | --- | --- | --- | --- | --- |
| Catalyst (g) |  |  |  |  |  |  |
| Stannous octoate | — | 0.2 | — | — | 0.05 | 0.05 |
| TEDA | — | — | 0.05 | — | — | 0.01 |
| PMETA | — | — | — | 0.05 | — | — |
| Cobalt naphthenate | — | — | — | — | 0.01 | — |
| Pot life (minutes) | 11 | 6 | 12 | 13 | 12 | 4 |
| Releasing time (minutes) | 150 | 80 | 60 | 80 | 30 | 35 |
| Hardness (Hs) | 85 | 80 | 85 | 85 | 87 | 75 |
| Tensile strength (kg/cm$^2$) | 285 | 315 | 310 | 290 | 330 | 220 |
| Break expansion (%) | 430 | 520 | 450 | 430 | 470 | 420 |
| Transparency | semi-transparent | opaque | semi-transparent | transparent | semi-transparent | transparent |

Note:
In the table, TEDA stands for triethylenediamine and PMETA for N,N,-N',N'',N''-pentamethyldiethylenetriamine.

EXAMPLE 7

Urethane elastomers with varied hardness values were produced in the same manner as described in Example 1, using various amounts of PTMG, 2,3-TCDAM and TDI-80. The results are shown in Table 4.

Table 4

| Exp. No. | I | II | III | IV |
| --- | --- | --- | --- | --- |
| PTMG (g) | 100 | 100 | 100 | 100 |
| 2,3-TCDAM (g) | 6 | 13 | 20 | 25 |
| TDI-80 (g) | 20 | 24 | 28 | 25 |
| TEDA (g) | 0.05 | 0.05 | 0.05 | 0.05 |
| Pot life (minutes) | 25 | 18 | 11 | 4 |
| Releasing time (minutes) | 125 | 80 | 45 | 30 |
| Hardness (Hs) | 72 | 81 | 89 | 94 |
| Tensile strength (kg/cm$^2$) | 280 | 305 | 325 | 350 |
| Break expansion (%) | 760 | 580 | 450 | 380 |
| Repulsive elasticity (%) | 45 | 45 | 45 | 40 |
| Tear resistance (kg/cm) | 43 | 68 | 85 | 92 |

EXAMPLES 8–12

Urethane elastomers were produced in the same manner as described in Example 1 by using polytetramethylene ether glycol (PTMG; OH number 100), polypropylene ether triol (GPT; OH number 110) produced by polymerizing propylene oxide in the presence of glycerol as initiator, 2,3-TCDAM, TDI-80 and TEDA. The proportion of the individual ingredients and physical characteristics of the resulting products are compared in Table 5. According to the process of the present invention, urethane elastomers with an extremely high hardness can be produced in a one-shot molding operation by selecting a suitable long-chain triol. The urethane elastomers with such high hardness also show low distortion against compression and thus are suitable as sealants for oil pressure-operated instruments where high pressure-resistance is required.

Table 5

|  | Comparative Example | Example 8 | Example 9 | Example 10 | Example 11 | Example 12 |
| --- | --- | --- | --- | --- | --- | --- |
| PTMG | 100 | 90.0 | 80.0 | 70.0 | 30.0 | 20.0 |
| GPT | 0 | 10.0 | 20.0 | 30.0 | 70.0 | 80.0 |

Table 5-continued

|  | Comparative Example | Example 8 | Example 9 | Example 10 | Example 11 | Example 12 |
|---|---|---|---|---|---|---|
| 2,3-TCDAM | 25 | 25.0 | 26.0 | 27.0 | 31.0 | 32.0 |
| TDI-80 | 31 | 30.5 | 31.0 | 32.0 | 34.5 | 35.5 |
| TEDA | 0.02 | 0.02 | 0.02 | 0.02 | 0.02 | 0.02 |
| Pot life (minutes) | 4 | 6 | 6 | 5 | 4 | 3 |
| Releasing time (minutes) | 30 | 40 | 35 | 30 | 30 | 30 |
| Hardness (Hs) | 94 | 92 | 92 | 90 | 97 | 98 |
| Tensile strength (kg/cm$^2$) | 350 | 390 | 230 | 205 | 305 | 355 |
| Break expansion (%) | 380 | 480 | 350 | 480 | 190 | 140 |
| Repulsive elasticity (%) | 40 | 45 | 44 | 41 | 38 | 38 |
| Compression distortion (%)* | 82 | 73 | 62 | 55 | 35 | 37 |

*(70° C × 22 hours)

EXAMPLE 13

The effects of various catalysts were compared by using 100 g of polytetramethylene ether glycol (PTMG; OH number 100), 19 g of 2,6-TCDAM and 29 g of TDI-80 and various catalysts, and mixing and molding the mixture in the same manner as described in Example 1. The results of the comparison are tabulated in Table 6.

Table 6

| Exp. No. | I | II | III | IV |
|---|---|---|---|---|
| Catalyst (g) |  |  |  |  |
| Stannous octanoate |  | 0.2 | — | — |
| TEDA |  | — | 0.05 | — |
| PMETA |  | — | — | 0.05 |
| Pot life (minutes) | 30 | 11 | 13 | 18 |
| Releasing time (minutes) | 360 | 150 | 80 | 80 |
| Hardness (HS) | 70 | 87 | 85 | 82 |
| Tensile strength (kg/cm$^2$) | 220 | 305 | 295 | 260 |
| Break expansion (%) | 520 | 450 | 430 | 480 |
| Repulsive elasticity % | 38 | 40 | 41 | 40 |
| Tear resistance (kg/cm) | 40 | 45 | 48 | 42 |

Notes:
2,6-TCDAM stands for 4,4'-methylene-bis-(2,6-dichloroaniline) (new compound)

What is claimed is:

1. A one-shot process for the production of solid urethane elastomers, characterized by reacting simultaneously a water-free mixture consisting essentially of a long-chain polyol having a molecular weight of 400–5000, an organic diisocyanate and at least one halogenated aromatic diamine

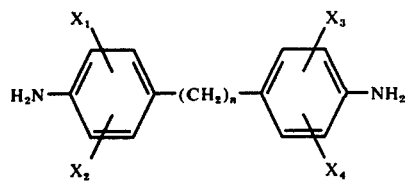

selected from the group consisting of 3,3',5,5'-tetrachlorobenzidine, 2,2',5,5'-tetrachlorobenzidine, 4,4'-methylene-bis(2,5-dichloroaniline) 4,4'-methylene-bis(2,3-dichloroaniline), and 4,4'-methylene-bis(2,6-dichloroaniline), said diamine being preliminarily dissolved in said polyol without reacting the same and said diisocyanate and then being added to the resultant mixture to effect said simultaneous reaction.

2. A process according to claim 1 wherein said long-chain polyol is at least one of a polyester glycol, a polyalkylene ether glycol, polybutadine having terminal hydroxyl groups, a copolymerizate of at least two alkylene oxides, a copolymerizate of at least two glycols with a dicarboxylic acid, a diol such as a mixture of aromatic glycols, a polyester polyol having 2–4 hydroxyl groups per molecule obtained by cocondensing a polyol and an aliphatic glycol with a dicarboxylic acid, and a polyether polyol having 2–4 hydroxyl groups per molecule obtained by decyclizing polymerization of a cyclic ether in the presence of a polyol as initiator.

3. A process according to claim 1 wherein said aromatic diisocyanate is 2,4-tolylene diisocyanate, 2,6-tolylene diisocyanate, a dimer of 2,4-tolylene diisocyanate, m-phenylene diisocyanate, 4,4'-biphenyl diisocyanate, 3,3'-ditoluene-4,4'-diisocyanate, dianisidine diisocyanate, 4,4'-diphenylmethane diisocyanate, 3,3'-dimethyl-4,4'-diphenylmethane diisocyanate, 1,5-naphthalene diisocyanate or a combination thereof.

4. A process according to claim 1 wherein said aromatic diisocyanate is used in an amount of 0.90–1.30 equivalent for the total number of —NH$_2$ groups present in said halogenated aromatic diamine and —OH groups present in said long-chain polyol 5. A process according to claim 1 wherein the reaction is carried out in the presence of at least one catalyst selected from the group consisting of inorganic tin compounds, organic tin compounds, tertiary amines, cyclic amidines and quaternary ammonium salts thereof, cobalt naphthenate, sodium o-phenylphenate, bismuth nitrate, potassium oleate, tetra (2-ethylhexyl) titanate, cobalt 2-ethylhexoate, ferric chloride, ferric 2-ethylhexoate, zinc naphthenate and antimony trichloride.

6. A process according to claim 1 wherein said long-chain polyol, said organic diisocyanate and said halogenated aromatic diamine are reacted together at the same time at a temperature ranging from room temperature to 150° C.

* * * * *